United States Patent
Glusing et al.

(10) Patent No.: US 6,625,016 B2
(45) Date of Patent: Sep. 23, 2003

(54) REMOVABLE CARTRIDGE FOR PCMCIA CARD ANCILLARY STORAGE DRIVE

(75) Inventors: William C. Glusing, Merritt Island, FL (US); Victor W. Wolynski, Cocoa, FL (US); Walter L. Olson, Melbourne, FL (US); Richard P. McNeight, Indian Harbour Beach, FL (US)

(73) Assignee: Paravant Computer Systems, Inc., Palm Bay, FL (US)

( * ) Notice: Subject to any disclaimer, the term of this patent is extended or adjusted under 35 U.S.C. 154(b) by 0 days.

(21) Appl. No.: 10/101,141

(22) Filed: Mar. 19, 2002

(65) Prior Publication Data

US 2002/0139850 A1 Oct. 3, 2002

Related U.S. Application Data

(60) Provisional application No. 60/277,364, filed on Mar. 20, 2001.

(51) Int. Cl.[7] ................................................ H05K 5/00
(52) U.S. Cl. ....................... 361/686; 361/679; 361/737; 361/728; 439/59
(58) Field of Search ................................. 361/683, 684, 361/685, 686, 725, 727, 728; 174/17 R, 66, 67; 439/59, 271, 438, 131, 640, 928.1

(56) References Cited

U.S. PATENT DOCUMENTS

| | | | | |
|---|---|---|---|---|
| 5,457,601 A | * | 10/1995 | Georgopulos et al. | 361/686 |
| 5,583,745 A | * | 12/1996 | Uwabo et al. | 361/685 |
| 6,075,706 A | * | 6/2000 | Learmonth et al. | 361/737 |
| 6,099,355 A | * | 8/2000 | Johnson et al. | 439/638 |
| 6,173,405 B1 | * | 1/2001 | Nagel | 713/200 |
| 6,217,351 B1 | * | 4/2001 | Fung et al. | 439/131 |
| 6,222,726 B1 | * | 4/2001 | Cha | 361/683 |
| 6,333,860 B1 | * | 12/2001 | Oliphant et al. | 439/640 |
| 6,353,870 B1 | * | 3/2002 | Mills et al. | 710/301 |

* cited by examiner

Primary Examiner—Boris Chervinsky
(74) Attorney, Agent, or Firm—Allen, Dyer, Doppelt, Milbrath & Gilchrist, P.A.

(57) ABSTRACT

A cartridge interface retains and couples a first information device, such as PCMCIA type card, with an internal connector of a host computer used in a rugged environment. It may also retain a second information device, such as a memory drive, separate from the first information device. The host computer has a cartridge insertion slot that guides the cartridge and a connector of the PCMCIA card into engagement with the computer's internal connector. The PCMCIA card is retained on the cartridge in a manner that prevents translation of the card relative to the cartridge during removal from the host computer.

25 Claims, 5 Drawing Sheets

REMOVABLE CARTRIDGE FOR PCMCIA CARD ANCILLARY STORAGE DRIVE

CROSS-REFERENCE TO RELATED APPLICATION

The present application claims the benefit of co-pending U.S. provisional application Ser. No. 60/277,364, filed Mar. 20, 2001 by W. Glusing et al, entitled: "Removable Cartridge for PC Card and Disk Drive," assigned to the assignee of the present application and the disclosure of which is incorporated herein.

FIELD OF THE INVENTION

The present invention relates in general to a ruggedized structure for housing, protecting and interfacing an information device, such as, but not limited to a PCMCIA (Personal Computer Memory Card International Association) type card or similar circuit card type of device, with electronic equipment, such as but not limited to a portable personal computer (PC), personal digital assistant (PDA), and the like. The invention is particularly directed to a new and improved information device-retaining cartridge, that is configured to protectively house one or more information devices for removable engagement with an internal electrical connector of host computer equipment, while providing selective external access to either device.

BACKGROUND OF THE INVENTION

There are a number of information devices, such as PCMCIA (Personal Computer Memory Card International Association) type cards, that are configured as relatively compact computer-interfaces, and are intended to serve as industry standard interconnections between an electronic unit, such as a personal computer, and an auxiliary device, such as a communication interface (e.g. USB, Ethernet, wireless LAN/GPS antenna) modem, compact disk (CD) storage and retrieval unit, memory unit, and the like. Now although a compact information device may be configured to be readily 'plugged in' to a multipin socket of a device-receiving slot (e.g., card slot) of host equipment, that capability alone does not ensure that the installation will be trouble free. This is especially true where the host unit is expected to be used in an environment subject to substantial 'hostile' ambient influences, such as vibration, as well as moisture and foreign matter that may enter the host device through a device insertion slot.

Prior art proposals to deal with this problem have included the use of a protective sleeve designed to fit around a PCMCIA card, such as the sleeve device described in U.S. Pat. No. 5,575,670 (the '670 patent), or a protective seal-retaining, 'end cap' type of adapter, such as that described in U.S. Pat. No. 6,099,355 (the '355 patent). Such an end cap adapter is configured to engage one end of the card, providing a protective seal against the external surface of the computer surrounding the PCMCIA card slot, while also supplying an electrical link between an external connector, mounted on the adapter, and the input/output receptacle of the PCMCIA card that has been inserted into engagement with an associated connector internally of the computer's PCMCIA card slot.

A shortcoming of the protective sleeve approach of the '670 patent is the fact that it does not protect the card's input/output port—something which the protective seal end adapter disclosed in the '355 patent is designed to do. However, although the adapter of the '355 patent is designed to provide a protective seal around the perimeter of the computer's card slot, it is essentially an end cap with an electrical pass-through. As such, it cannot ensure that the card will properly mechanically and electrically engage a connector at the far end of the card slot. Instead, like other conventional card interfaces, proper engagement of the (PCMCIA) card depends upon the relatively limited structure of the computer's card insertion slot, which is typically designed for a desk top or lap-top type of device.

SUMMARY OF THE INVENTION

In accordance with the present invention, these and other shortcomings of prior art device interfaces, such as those designed for PCMCIA type cards, are effectively obviated by a new and improved ruggedized 'cartridge'-based, information device-retention architecture. As will be described, the cartridge of the invention is sealable against the outer surface of a host (computer) unit, and is configured to removably hold or capture at least a first information device, such as a PCMCIA type card, memory drive, etc. The cartridge is configured to retain a device in a manner that provides for aligned engagement with an internal electrical connector within a cartridge-receiving slot of the host equipment.

In addition to retaining a first information device, the cartridge according to the invention is configured to protectively house a second information device, either individually, or simultaneously with the first device. The second device, such as an auxiliary memory drive, as a non-limiting example, is retained at a location of the cartridge that is separate from the location of the first device. Moreover, the cartridge may be configured to provide external access to either or both devices.

For this purpose, the cartridge of the invention comprises a generally rectangular cartridge frame that is slidably insertable along guide rails of a shrouded cartridge-insertion slot of a host (computer) equipment, and securely retains at a first location thereof a first information device, such as an electronic PCMCIA card, or other type of device, such as an optical or a magnetic based component. When captured by the cartridge, the first device may readily engage a multipin electrical connector mounted on a host equipment's printed circuit board. One end of the cartridge frame has a faceplate that is sealable against the exterior surface of the housing of the host equipment.

A pair of generally longitudinally extending side rails extend parallel to and are slightly spaced apart from side edges of a top wall of the cartridge frame and support hold-down spring fingers of a hold-down spring element. Those portions of the surface of the top wall between the side edges of the top wall and the side rails support the cartridge on a pair of guide rails of a cartridge insertion slot.

The hold-down spring fingers have generally flat, stripe shaped portions supported by the longitudinally extending side rails when the hold-down spring element is affixed to the frame. The hold-down spring fingers have respective device (e.g., PCMCIA type card)-engaging, V-shaped distal ends, that are adapted to engage and be spring-biased against the top surface of a device that has been placed upon the top wall of the cartridge frame, thereby mechanically urging the captured device into a generally 'snug' flat abutment with the cartridge frame.

A generally flat and relatively thin device (e.g., card) retention plate has a pair of spaced apart, generally flexible device-retention tangs that extend generally transverse to the plane of the plate and are sized to engage a rearward edge of a device retained on the cartridge frame. By abutting the end of the device/card, the retention tangs prevent its translation along the longitudinal (device insertion/removal) direction of the cartridge. This serves to ensure that a multiconductor socket at the forward end of the captured device will fully mechanically and electrically mate with a multipin carrier connector atop a carrier connector printed circuit board mounted at the forward end of the frame and containing wiring to an external multipin cylindrical cable connector.

Like its forward end, the rearward end of the captured device that is engaged by the retention tangs contains a multiconductor socket that is configured to mate with a multipin connector mounted to a printed circuit board within the host equipment. The multipin connector is adjoined by a 'capture' plate, that is configured to engage the retention plate when the cartridge is fully inserted into the host unit. The capture plate is configured to maintain the retention tangs against the device, until the device's multiconductor socket has become fully disengaged from its associated multipin connector on the printed circuit board within the host unit, in the course of removal of the cartridge. This ensures that the device will not remain engaged with the multipin connector on the printed circuit board due to socket-pin friction during removal of the cartridge from the host unit.

A light pipe element is affixed to the forward portion of the top wall adjacent to the carrier connector and serves to optically couple an optical indicator on the device to an associated aperture in the cartridge faceplate. External electrical access to the carrier connector for the captured device is provided by way of a multipin cylindrical cable connector mounted at a first location of the faceplate. Also, external electrical access to a multipin electrical connector for a second device, such as an auxiliary card, may be provided by way of a multipin cylindrical cable connector mounted at a second location of the faceplate.

A generally V-shaped connector-restriction cam is pivotally mounted on the cartridge faceplate between the two multipin cylindrical connectors. When pivoted against either one of the connectors, the V-shaped cam allows cable connection access to the other connector, but mechanically prevents access to the one connector. The cam prevents electrical cables from simultaneously engaging both connectors. It also has a bore that provides optical access to the light pipe element.

The bottom wall of the cartridge frame retains a printed circuit board having a device-capture frame in which a second device, such as an auxiliary (microdrive) memory element, is removably insertable. A flexible tab may be attached to the second device to facilitate its removal from its associated printed circuit board. Configuring the cartridge to retain a second device, such as, but not limited to an ancillary memory card, facilitates transport of multiple devices in a common protective enclosure and may be critical in a hostile/restricted access environment. This can be especially useful, where the second device comprises an auxiliary card that is used to supply ancillary data to an application program with which the host equipment is used.

The cartridge insertion slot of the host device is configured to receive and engage the device-retention cartridge. To protect adjacent components of the host equipment's printed circuit boards, and also provide a guide for the cartridge, a protective shroud of electrically insulating material is mounted to the host equipment's internal printed circuit board structure adjacent to the cartridge insertion slot. The sidewalls of the shroud have interior stand-off guide rails that serve to maintain a device that has been mounted at the top wall of the cartridge frame in spaced apart relationship from various components of the computer's circuit board, as the cartridge travels along the rails during its insertion into or removal from the host unit. Similarly, the top of the shroud prevents the device support structure on the bottom wall of the cartridge frame from coming in contact with components of the host unit.

A multipin connector on the host equipment's circuit board has a generally linear array of electrical conductor pins that are engageable by an associated linear array of socket conductors of a device that has been captured on the cartridge frame. A capture plate is mounted atop the multipin connector so as to extend slightly beyond distal ends of the pins. This ensures that the capture plate will engage the retention plate just prior to the array of socket conductors of the device coming into contact with the array of electrical conductor pins of the connector, as the cartridge is inserted into the insertion slot of the host unit.

This anti tang-deflection force of the capture plate against the retention plate maintains the retention tangs against the device, so that friction between the multipin connector and the multipin socket of card cannot cause the installed information device (such as a PCMCIA type card) to produce a deflection of the tangs, that might otherwise allow the device to become detached from the cartridge during the latter's removal from the host equipment. Once the device's multiconductor socket has become fully disengaged from the multipin connector, the anti-deflection force of the capture plate against the tangs is no longer required, and the tangs will remain engaged with the information device as the cartridge is removed.

DETAILED DESCRIPTION

Figure 1:
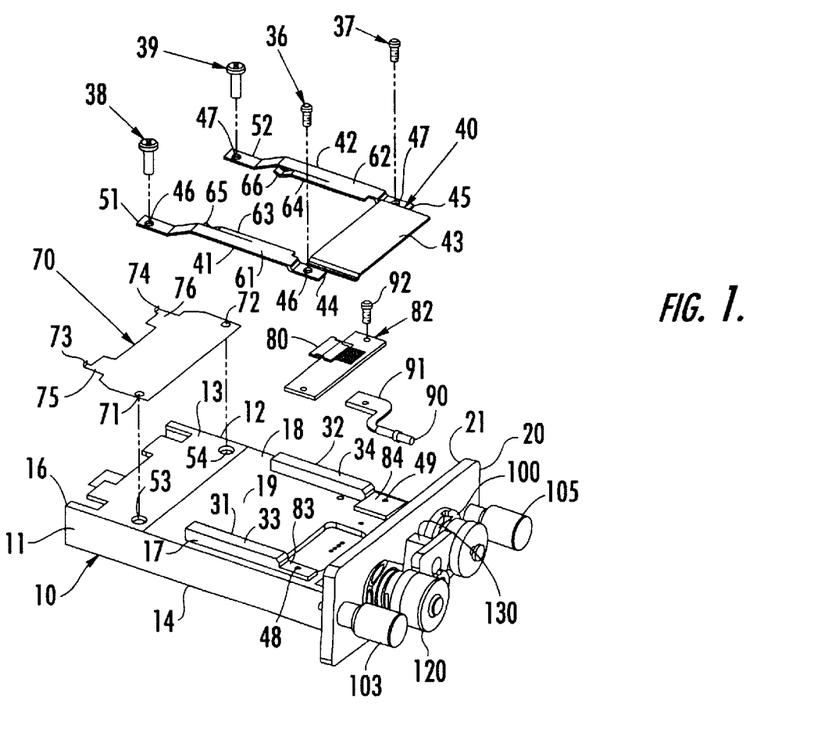
FIGS. 1 and 2 are respective partially exploded top and bottom perspective views of an information device-retention cartridge in accordance with the present invention.
Figure 2:
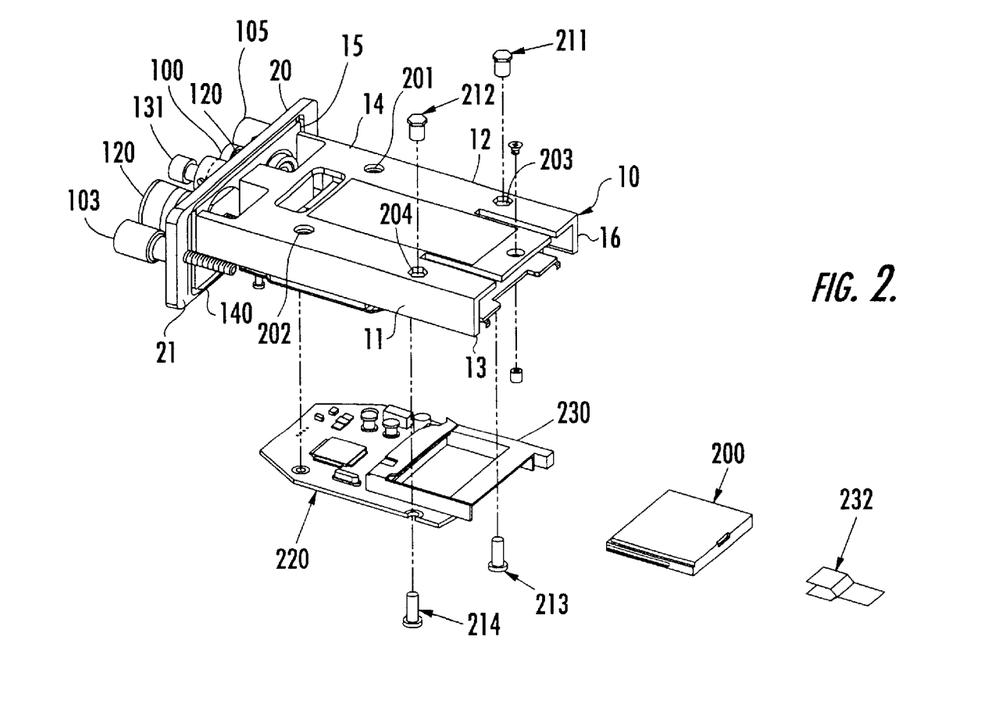

Attention is initially directed to FIGS. 1 and 2, which are respective partially exploded top and bottom perspective views of an information device-retention cartridge in accordance with the invention. The cartridge comprises a generally rectangularly-configured frame 10, having a pair of spaced apart generally rectangular, parallel side walls 11 and 12, that adjoin and are solid with a top wall having adjoining, offset topwall portions 13 and 19, and a bottom wall or floor 14. As will be described, the cartridge frame is configured to be readily slidably inserted along guide rails of a shrouded cartridge-insertion slot of a host (computer)

equipment or unit, so as to securely seat a device, such as but not limited to a PCMCIA type card that is retained by the cartridge, in aligned engagement with an electrical connector installed at an interior region of the cartridge insertion slot. In this cartridge-installed position, a sealing member in the form of a gasket is sized to surround the cartridge insertion slot on the interior side of a cartridge faceplate becomes sealed against the host, and thereby protect its interior from the entry of moisture and foreign matter.

Figure 3:
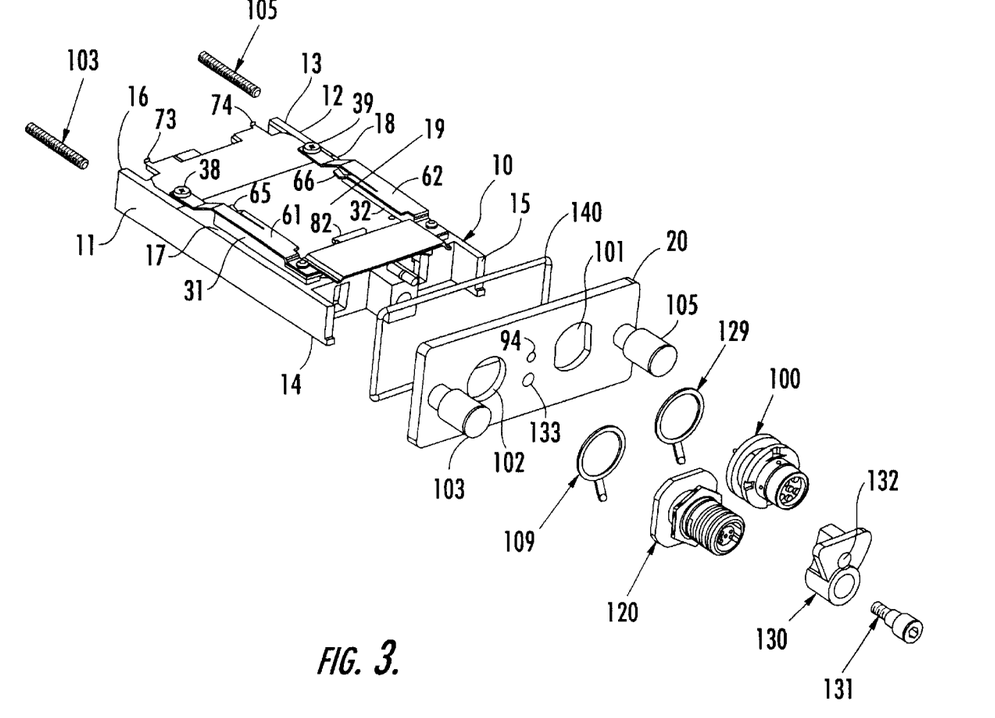
FIG. 3 is a perspective view of the cartridge of FIGS. 1 and 2, showing the faceplate in exploded detail.

For this purpose, a forward end 15 of the frame 10 is affixed to an interior face 21 of a faceplate 20 shown in detail in the exploded perspective view of FIG. 3. In order to prevent undesired rotation or play of the frame 10 relative to the faceplate 20, left and right side portions of the forward edge 15 of the frame 10 may be keyed to be inserted into corresponding indents or slots in the interior face 21 of the faceplate. The faceplate is sized to engage the exterior surface of the housing of a host equipment (e.g., portable computer). As a non-limiting example, FIGS. 4 and 5, to be described, show the host unit as having a generally rectangularly shaped housing and retaining a computer circuit board with a multipin connector for electrically engaging pins of an associated connector of a device retained by the cartridge.

As further shown in FIGS. 1 and 3, adjacent to respective spaced apart side walls 11 and 12 of the cartridge frame 10, top wall portion 19 has a pair of generally longitudinally extending side rails 31 and 32, spaced part from the forward end 15 and a rearward end 16 of the frame 10. These side rails extend parallel to and are slightly spaced apart from side edges of the top wall portion 19, so as to leave respective surface portions 17 and 18 of the top wall portion 19 of the cartridge frame 10 that are used to support the cartridge on a pair of guide rails of a cartridge insertion slot, as will be described.

Side rails 31 and 32 are configured to receive and support respective hold-down spring fingers 41 and 42 of a hold-down spring element 40. The hold-down spring element 40 further includes a device connector shroud 43, that is solid with respective forward ends 44 and 45 of the hold-down spring fingers 41 and 42. The forward ends 44 and 45 of the hold-down spring fingers 41 and 42 have respective slots 46 and 47 for receiving fittings, such as screws and the like (shown at 36 and 37), for attachment to associated (threaded) bores 48 and 49 in the top wall portion 19 adjacent to the forward end of the cartridge frame 10. Similarly, respective rearward ends 51 and 52 of the hold-down spring fingers 41 and 42 have respective slots 46 and 47 for receiving fittings (shown at 38 and 39), for attachment at associated bores 53 and 54 adjacent to the rearward end 16 of top wall portion 13 of the cartridge frame 10.

The respective hold-down spring fingers 41 and 42 have generally flat, stripe-shaped portions 61 and 62, that are sized to rest upon and be supported by associated flat top surfaces 33 and 34 of the longitudinally extending side rails 31 and 32, when the hold-down spring element 40 is affixed to the cartridge frame 10. Extending alongside these stripe-shaped portions 61 and 62, the hold-down spring fingers 41 and 42 have respective device (e.g., PCMCIA type card)-engaging portions 63 and 64 with generally V-shaped distal ends 65 and 66. As such, the distal ends of the hold-down spring fingers 41/42 are adapted to engage and be spring-biased against the top surface of an information device (such as a PCMCIA type card), that has been placed upon the top wall of the cartridge frame 10, so as to mechanically urge the device into a generally 'snug' flat abutment with the top wall of cartridge frame 10.

A generally flat, relatively thin, device-retention plate 70 has bores 71 and 72 that are sized to receive the fittings 38 and 39 for attaching rearward ends 51 and 52 of the hold-down spring fingers 41 and 42 to the rearward end 16 of top wall portion 13 of the cartridge frame 10. This retention plate 70 has a pair of spaced apart, generally flexible flanges 75 and 76, distal ends of which have respective device-retention tangs 73 and 74, that extend upwardly or generally transverse to the plane of the plate 10, and are sized to engage a rearward edge of a device retained on the top wall of the cartridge frame 10. By abutting the end of the installed information device, the card-retention tangs 73 and 74 prevent translation of the captured device/card along the longitudinal (card insertion/removal) direction of the cartridge.

As noted briefly above, this ensures that a multiconductor socket at the forward end of the captured device/card will be fully mechanically and electrically mated with a multipin carrier connector 80 atop a carrier connector printed circuit board 82, that has been mounted to respective, reduced land portions 83 and 84 of side rails 31 and 32 adjacent to the forward end of cartridge frame 10. To provide external electrical connectivity with the captured device, a multipin (cylindrical) cable connector may be mounted on the faceplate 20. The printed circuit board 82 may contain wiring to external multipin cylindrical cable connector 100, to facilitate changing either connector, as required.

Like its forward end, the rearward end of the device/card engaged by the card-retention tangs 73 and 74 has a multi-conductor socket, configured to mate with a multipin connector that mounted to a printed circuit board within the host device. As will be described, this multipin connector is adjoined by a 'capture' plate, that is configured to engage retention plate 70, when the cartridge is fully inserted into the host equipment.

In particular, the capture plate is configured to maintain the retention tangs 73 and 74 against the captured information device/card, until the latter's multiconductor socket has become fully disengaged from its associated multipin connector on the printed circuit board within the host unit, in the course of removing the cartridge. This ensures that the cartridge-retained device/card cannot be 'left behind' (still engaged with the multipin connector on the printed circuit board due to socket-pin friction) during removal of the cartridge from the host unit.

A light pipe element 90 having a mounting portion 91 is affixed to the forward portion 15 of the top wall portion 19, adjacent to the carrier connector 80, by means of a suitable fastener (e.g., screw) 92, and serves to optically couple an optical indicator of the information device/card to an associated aperture 94 in the faceplate 20. As noted above, external electrical access to the carrier connector 80 for the device/card may be provided by way of multipin cylindrical cable connector 100, shown as having a grounding ring 129 at a first aperture 101 of the faceplate 20. In like manner, where external electrical access to a multipin electrical connector for a second information device, such as an auxiliary card shown at 220 in the frame bottom view of FIG. 2, is to be provided, a multipin cylindrical cable connector 120 (having an associated grounding ring 109) may be mounted at a second aperture of the faceplate 20.

Where it is desired to provide external electrical access to each of first and second information devices retained by the cartridge, the multipin (cylindrical) connectors 100 and 120 may be positioned on the faceplate 20 with a generally V-shaped connector-restriction cam 130 pivotally mounted therebetween. The restriction cam may be pivotally mounted to the faceplate by way of a screw 131 threaded into a bore 133 in faceplate 20. In this configuration, when the V-shaped cam 130 is pivoted against either one of the connectors, cable connection access to the other connector is allowed, but denied to the one connector. In this manner, the cam 130 prevents electrical cables from simultaneously engaging both connectors 100 and 120. In addition to being pivotable between the two connectors, and being sized and shaped to allow only one of the two connectors 100 and 120 at the time to be engaged by an associated cable, cam 130 has a bore 132 that provides optical access to the light pipe element 90.

The faceplate 20 also contains respective fasteners 103 and 105, such as thumbscrews or the like, that are configured to engage bores in the host unit's housing, on either side of the cartridge insertion slot, so that the cartridge may be securely retained in the host unit. A generally rectangular shaped gasket 140 of a suitable moisture-proof material, such as neoprene rubber containing a conductive material, is installed on the interior face 21 of the faceplate 20, and is sized to surround the cartridge insertion slot. This effectively provides two functions. First, the cartridge faceplate 20 becomes moisture-sealed against the host unit's housing; second, the sealing gasket is sized to allow the interior face 21 of faceplate 20 to sit flush with and electrically contact the mating surface of the housing structure 310 and 320 around the cartridge insertion slot 330, shown in FIG. 6. This serves to minimize radiation of electromagnetic interference (EMI) through the cartridge insertion slot.

As further shown in the bottom perspective view of FIG. 2, the bottom wall 14 of the frame 10 may support a second information device. For this purpose, the bottom wall has a plurality of bores (four of which are shown at 201, 202, 203 and 204), that are sized to receive associated fasteners 211, 212, 213 and 214, such as screws and the like, for retaining a printed circuit board (PCB) 220. PCB 220 has a device-capture frame 230 with respect to which a second information device, such as an auxiliary memory drive 200, is removably insertable. Similar to the printed circuit board 82 that supports the carrier connector 80 for the first device/card, described above, printed circuit board 220 may contain wiring to an associated external multipin cylindrical cable connector 120, mounted on the faceplate 20, as described above. To facilitate removal of the second device 200 from its capture frame 230 mounted to the bottom wall of the cartridge, a flexible tab 232 may be adhesively attached to the device. Also, a connector may be provided to allow the second device to be interfaced with an associated connector of the host unit.

As pointed out above, the cartridge of the present invention is capable of retaining one or more devices at respective support locations that are separate and distinct from one another. In the non-limiting example, shown herein, the first device (e.g., a PCMCIA type card) is configured to become engaged with the host device, when the cartridge is installed in its cartridge insertion slot, whereas the second device, such as an auxiliary microdrive, is retained in a non (host)-engaged configuration at a separate support location (at the bottom) of the frame. This manner of retaining the second (auxiliary) device takes advantage of the space availability provided by the cartridge. As noted earlier, this can be especially useful where the second device may comprise an auxiliary memory device, that is used to supply ancillary data to an application program with which the host equipment is used. The availability of auxiliary storage space and electrical access facilitates transport of both cards in a common protective enclosure and may be critical in a hostile/restricted access environment.

Figure 4:
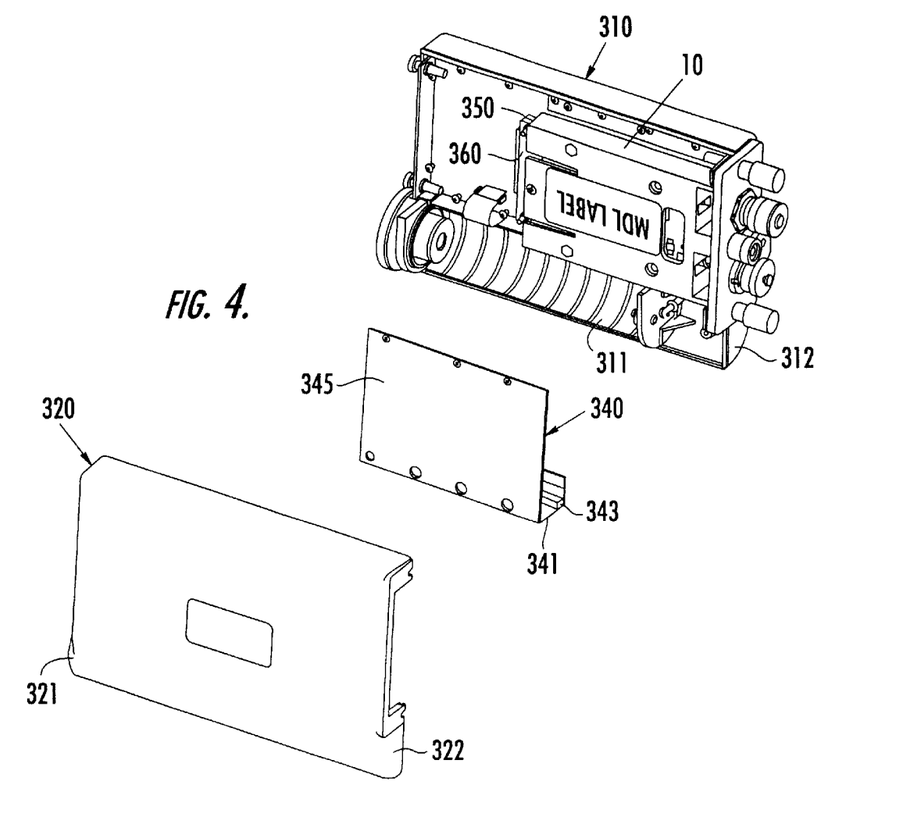
FIGS. 4 and 5 are partially exploded opposite side perspective views of a host equipment's housing structure having a cartridge insertion slot configured to receive the cartridge of FIGS. 1–3.
Figure 5:
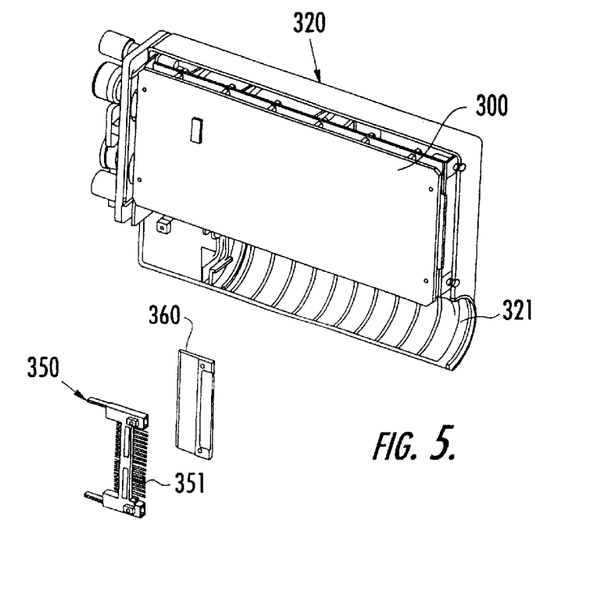

FIGS. 4 and 5 are partially exploded opposite side perspective views of a non-limiting example of the housing structure of a host unit (e.g., portable personal computer) having a cartridge insertion slot that is configured to receive and engage a device-retention cartridge in accordance with the invention described above with reference to FIGS. 1–3. As shown in FIGS. 4 and 5, the components of the host unit proper may be distributed on one or more electronic printed circuit boards 300, in a stacked or spaced apart arrangement secured to generally longitudinally configured 'right' and 'left' half casings 310 and 320, joined together to form a protective enclosure for the host unit (computer). The half casings are also shown as including generally semi-cylindrical portions 311 and 321 that form a cylindrical battery compartment, in a manner customary in the art.

Figure 6:
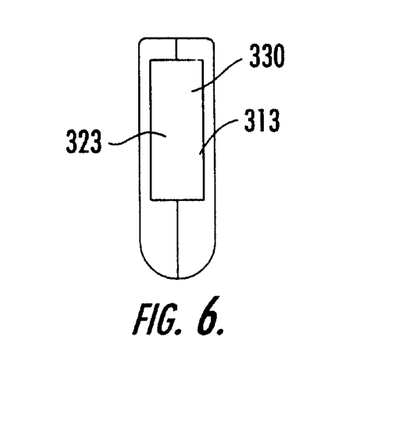
FIG. 6 is a diagrammatic end view of a host unit's casing having a cartridge insertion slot for receiving the cartridge of FIGS. 1–3.
Figure 7:
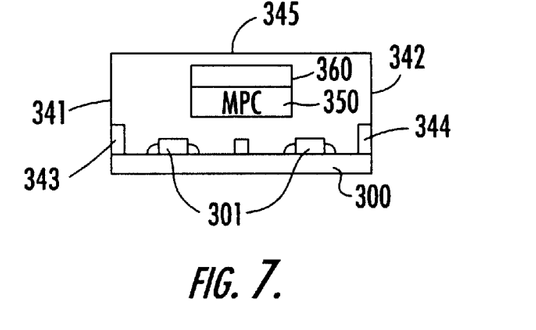
FIGS. 7 and 8 are respective end and perspective views of a protective guide shroud for the cartridge of FIGS. 1–3.
Figure 8:
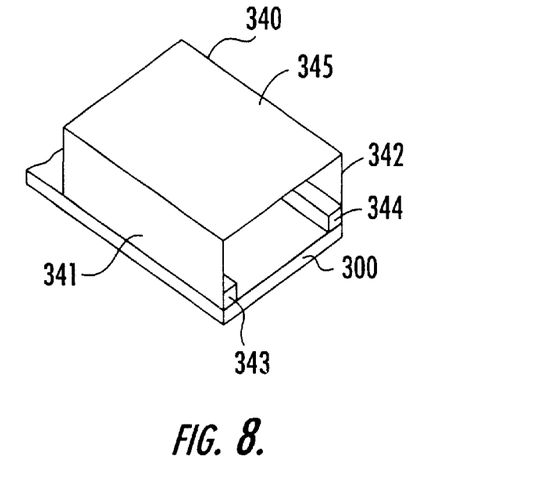

As shown in the casing end view of FIG. 6, respective 'forward' end walls 312 and 322 of the half casings are configured to form respective halves 313, 323 of a cartridge insertion slot 330, that is sized to receive the cartridge described above. In order to protect adjacent components of the host unit's printed circuit boards and guide the cartridge as it is being inserted into the slot 330, a protective shroud 340 of electrically insulating material, shown in the diagrammatic end view of FIG. 7 and in the perspective view of FIG. 8, is mounted to printed circuit board structure 300 immediately adjacent to card insertion slot 330.

To guide the cartridge into aligned engagement with a multipin connector 350 and an associated capture plate 360 mounted on the printed circuit board structure 300, respective sidewalls 341 and 342 of the shroud 340 are provided with interior stand-off guide rails 343 and 344 affixed to the printed circuit board structure 300. These non-conductive guide rails serve to maintain a device, such as PCMCIA type card mounted at the top wall of the cartridge frame 10, spaced apart from various components 301 of the PCB 300, as the cartridge travels along the rails during its insertion into or removal from the host device. The sidewalls 341 and 342 of the shroud terminate at a top or cover 345, that provides structural integrity to the protective shroud 340 and insure constant and exact aligned engagement of a multi-conductor socket at the forward end of the device with the multipin carrier connector 80 atop the carrier connector printed circuit board 82.

Figure 9:
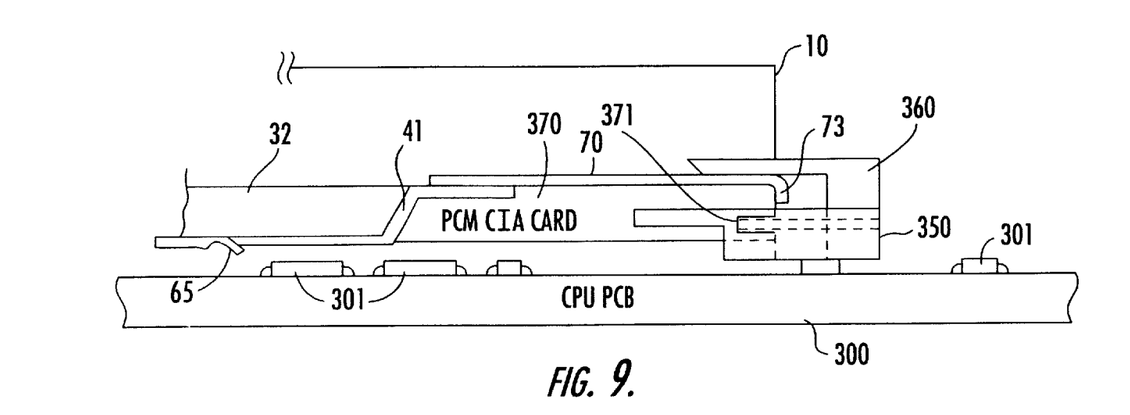
FIGS. 9 and 10 are diagrammatic partial side views illustrating the retention tang bias functionality of the capture plate of the cartridge of FIGS. 1–3.

As shown in the perspective view of FIG. 5 and the diagrammatic partial side view of FIG. 9, the multipin connector 350 is mounted to the PCB 300 and contains a generally linear array of electrical conductor pins 351. The connector 350 is configured such that its pins 351 may be readily engaged by an associated linear array of socket conductors 371 of a device 370 retained on the top wall of the cartridge frame 10, as described above. As shown in FIG. 9, the capture plate 360 is mounted atop the multipin connector 350 so as to extend slightly beyond distal ends over the pins 351.

Figure 10:
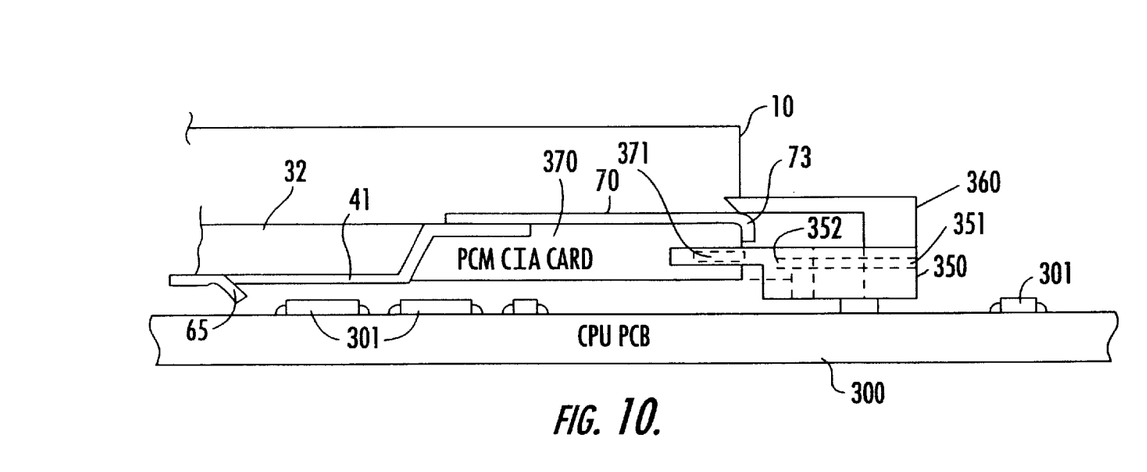

As a result, as shown in FIG. 10, in the course of the cartridge being inserted into the insertion slot 320 of the host unit and traveling along the guide rails 343 and 344, the capture plate 360 will engage the retention plate 70 just prior to the array of socket conductors 371 of the device 370 coming into contact with distal ends 352 of the array of electrical conductor pins 351 of the connector 350. This anti tang-deflection force of the capture plate 360 against the retention plate 70 will maintain the tangs 73 and 74 against the device/card 370, so that friction between the multipin connector 350 and the multipin socket of card 370 cannot cause the device/card to produce a deflection of the tangs, that might otherwise allow the device to 'escape' or become detached from the cartridge during the latter's removal from the host unit. Once the device's multiconductor socket 371 has become fully disengaged from the multipin connector 350, the anti-deflection force of the capture plate 360 against the tangs 73 and 74 is no longer required, and the retention tangs will remain engaged with the device as the cartridge is removed from its insertion slot.

As will be appreciated from the foregoing description, shortcomings of prior art information device interfaces are effectively obviated by the ruggedized 'cartridge'-based device/card retention architecture of the invention. This cartridge not only protects and holds a device, such as a PCMCIA type card, for aligned engagement with an internal electrical connector of a cartridge-receiving slot of a host computer unit, but can also house an auxiliary device, such as a microdrive, separate from the first device, while providing external access to either or both devices. Each device can be independently accessed and/or removed, for example, to comply with security requirements for a given function.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An assembly for interfacing an information device with a host computer unit, comprising a cartridge that is insertable into a cartridge insertion opening of said hosts computer unit, said cartridge having a first portion that is configured to receive and protectively retain a first information device for removable electrical and mechanical engagement with an internal electrical connector of said host computer unit accessible by way of said cartridge insertion opening of said host computer unit, and a second portion that is configured to receive and protectively house a second information device that is separate from and is mechanically and electrically isolated said first information device, and an external electrical connector unit that provides external electrical access to said first information device.

2. The assembly according to claim 1, wherein said cartridge includes a faceplate having a sealing member that is sized to surround said cartridge insertion opening, so as to become sealed against said host computer unit by insertion of said cartridge into said cartridge insertion opening, and thereby prevent moisture and foreign matter from entering the interior of said host computer unit through said cartridge insertion opening.

3. The assembly according to claim 1, wherein said external electrical connector unit is configurable to provide external electrical access to said first and second information devices.

4. The assembly according to claim 3, wherein said cartridge has a faceplate that is sealable against an exterior surface of said host computer unit adjacent to said cartridge-insertion opening, and wherein said faceplate includes a first electrical connector that provides external access to said first information device, and a second electrical connector that provides external access to said second information device.

5. The assembly according to claim 1, wherein said cartridge-insertion opening of said computer unit includes guide elements that guide insertion of said cartridge so as to bring a connector of said information device retained by said cartridge into aligned engagement with said internal electrical connector of said host computer unit.

6. The assembly according to claim 5, wherein said cartridge-insertion opening includes a capture plate that is urged against a retention plate engaging said information device and preventing said information device from becoming dislodged from said cartridge in the course of removal of said cartridge from said host computer unit.

7. The assembly according to claim 5, wherein said cartridge-insertion opening includes a capture plate that is urged against a retention plate engaging said information device to prevent said connector of said information device from remaining engaged with said internal electrical connector of said host computer unit in the course of removal of said cartridge from said host computer unit.

8. The assembly according to claim 1, wherein said first information device comprises a PCMCIA (Personal Computer Memory Card International Association) type card and said second information device comprises a memory device.

9. An assembly for interfacing an information device with a host computer unit, comprising a cartridge that is insertable into a cartridge insertion opening of said host computer unit, and is configured to receive and protectively retain an information device for removable electrical and mechanical engagement with an internal electrical connector of said host computer unit that is accessible by way of said cartridge insertion opening of said host computer unit, and an external electrical connector unit that provides external electrical access to said information device, wherein said cartridge has a first portion that is configured to receive and protectively house a first information device for removable electrical and mechanical engagement with said internal electrical connector of said host computer unit, and a second portion that is configured to receive and protectively house a second information device separate from said first information device, and wherein said electrical connector unit is configurable to provide external electrical access to said first and second information devices, and wherein said cartridge has a faceplate that is sealable against an exterior surface of said host computer unit adjacent to said cartridge-insertion opening, and wherein said faceplate includes a first electrical connector that provides external access to said first information device, and a second electrical connector that provides external access to said second information device.

10. The assembly according to claim 9, wherein said faceplate further includes a movable element between said first and second connectors and being selectively positionable so as to allow an external electrical connection to only one of said first and second connectors at a time.

11. The assembly according to claim 10, wherein said faceplate and said movable element are configured to provide external optical access to an optical indicator on said first information device.

12. An assembly for interfacing an information device with a host computer unit, comprising a cartridge that is insertable into a cartridge insertion opening of said host computer unit, and is configured to receive and protectively retain an information device for removable electrical and mechanical engagement with an internal electrical connector of said host computer unit that is accessible by way of said cartridge insertion opening of said host computer unit, and an external electrical connector unit that provides external electrical access to said information device, and wherein said cartridge includes a support surface upon which said information device is supported, and a hold-down element, that is configured to be biased against said information device installed on said support surface, so as to mechanically urge said information device against said support surface of said cartridge.

13. The assembly according to claim 12, wherein said hold-down element comprises a biasing spring element.

14. The assembly according to claim 12, cartridge further includes a generally flexible device-retention tang sized to engage said information device as retained on said support surface of said cartridge, and thereby prevent translation of said information device relative to said cartridge.

15. The assembly according to claim 14, wherein said cartridge-insertion opening includes a capture plate configured to engage said retention tang and urge said tang against said information device, in the course of insertion of said cartridge into said cartridge insertion opening that brings said connector of said information device, as retained by said cartridge, into aligned engagement with said internal electrical connector of said host computer unit and, in the course of removal of said cartridge from said cartridge insertion opening, to continue to engage said retention tang and urge said tang against said information device, until said connector of said information device has become fully disengaged from said internal electrical connector of said host computer unit.

16. The assembly according to claim 12, wherein said cartridge includes a frame having a first support surface upon which said first information device is removably supported, and a second support surface, separate from said first support surface, upon which said second information device is removably captured and electrically and mechanically isolating said second information device from said first information device.

17. The assembly according to claim 12, wherein said cartridge-insertion opening contains guide rails that prevent mutual engagement between internal circuit components of said host computer unit and said cartridge during insertion and removal of said cartridge.

18. A computer interface comprising a cartridge that is insertable into a cartridge insertion slot of said computer, and has a first portion that retains a first information device at a first portion thereof for engagement with an internal electrical connector of said computer, and a second portion that retains a second information device in mechanical and electrical isolation from said first information device, and wherein said cartridge includes retention elements that engage said first information device and prevent translation of said first information device relative to said cartridge during removal of said cartridge from said computer.

19. The computer interface according to claim 18, wherein said first information device comprises aa PCMCIA type card, and said second information device comprises a memory drive device.

20. An interface for a host computer unit comprising a cartridge having a first portion that removably retains and protects a first information device for removable electrical and mechanical engagement with an internal electrical connector of said host computer unit, and a second portion, electrically and physically isolated from said first portion, that removably retains and protects a second information device so that said second information device is electrically and mechanically isolated from said first information device, and wherein said host computer unit has a cartridge-insertion slot having guide elements that guide insertion of said cartridge therein and bring a connector of said first information device retained by said cartridge into aligned engagement with said internal electrical connector of said host computer unit, while preventing said first information device from becoming dislodged from said cartridge in the course of removal of said cartridge from said host computer unit, and wherein said cartridge includes a hold-down element that is urged against said first information device and retains said first information device on said first portion, and a generally flexible retention tang that engages said first information device and prevents translation of said first information device relative to said cartridge.

21. The interface according to claim 20, wherein said cartridge-insertion slot includes a capture plate, that engages said tang and urges said tang against said first information device in the course of insertion of said cartridge into said cartridge insertion slot that brings said connector of said first information device, as retained by said cartridge, into aligned engagement with said internal electrical connector of said host computer unit and, in the course of removal of said cartridge from said cartridge insertion slot, to continue to engage said tang and urge said tang against said first information device, until said connector of said first information device has become fully disengaged from said internal electrical connector of said host computer unit.

22. A method for removably coupling an information device with an internal electrical connector of a host computer unit, said method comprising the steps of:

(a) installing said information device on a cartridge that supports said information device for removable electrical and mechanical engagement with said internal electrical connector of said host computer unit, and provides electrical access to said information device; and (b) inserting said cartridge upon which said information device has been installed in step (a) into a cartridge-insertion slot of said host computer unit, and bringing a connector of said information device as retained by said cartridge into aligned engagement with said internal electrical connector of said host computer unit, and engaging said information device in a manner that prevents said information device from becoming dislodged from said cartridge in the course of removal of said cartridge from said host computer unit, and wherein said cartridge includes a hold-down element that is biased against said information device and thereby mechanically retains said information device thereon as inserted in step (a), and a generally flexible retention element that engages said information device and prevents translation of said information device relative to said cartridge during insertion of said cartridge into said cartridge-insertion slot of said host computer unit in step (b).

23. The method according to claim 22, wherein said information device comprises a PCMCIA (Personal Computer Memory Card International Association) type card.

24. The method according to claim 22, wherein said cartridge-insertion slot includes a capture plate that engages said retention element and urges said retention element against said information device, in the course of insertion of said cartridge into said cartridge insertion slot in step (b), so as to bring said connector of said information device, as retained by said cartridge, into aligned engagement with said internal electrical connector of said host computer unit and, in the course of subsequent removal of said cartridge from said cartridge insertion slot, to continue to engage said retention element and urge said retention element against said information device, until said connector of said information device has become fully disengaged from said internal electrical connector of said host computer unit.

25. The method according to claim 22, wherein step (a) further includes installing a second information device at a portion of said cartridge that is mechanically and electrically isolated from said first information device.

* * * * *